United States Patent
Lorenz et al.

[15] 3,669,928
[45] June 13, 1972

[54] PROCESS FOR THE PRODUCTION OF HIGH MOLECULAR WEIGHT POLYBENZOXAZINONES

[72] Inventors: Gunter Lorenz; Manfred Gallus; Wolfgang Giessler; Gunther Nischk, all of Dormagen, Germany

[73] Assignee: Farbenfabriken Bayer Aktiengesellschaft, Leverkusen, Germany

[22] Filed: June 26, 1970

[21] Appl. No.: 50,322

[30] Foreign Application Priority Data

July 1, 1969   Germany ...................... P 19 33 212.8

[52] U.S. Cl. .......................... 260/47 CP, 260/65, 260/78 TF, 260/78.4 R
[51] Int. Cl. .................................. C08g 20/20, C08g 30/02
[58] Field of Search ................ 260/47 CP, 78 TF, 78.4 R, 65

[56] References Cited

UNITED STATES PATENTS

| 3,342,774 | 9/1967 | Hoegger | 260/47 |
| 3,468,851 | 9/1969 | Yoda et al. | 260/78 |

Primary Examiner—William H. Short
Assistant Examiner—L. L. Lee
Attorney—Plumley & Tyner

[57] ABSTRACT

Improvement in the production of high molecular weight polybenzoxazinones from bis-anthranilic acid derivatives and dicarboxylic acid dihalides followed by ring closure of the polyamidocarboxylic acid obtained, wherein ring closure is effected by a liquid or dissolved dehydrating agent in an organic solvent.

8 Claims, No Drawings

PROCESS FOR THE PRODUCTION OF HIGH MOLECULAR WEIGHT POLYBENZOXAZINONES

This invention relates to an improvement in the process for the production of polybenzoxazinones by a ring-closing reaction on polyamido carboxylic acids in organic solvents wherein ring-closure is effected in the presence of dehydrating agents.

Aromatic polybenzoxyzinones are valuable heat-stable plastics which by virtue of these properties are eminently suitable for use as electrical insulating materials and may be used in the production of heat-resistant filaments and films, as composite materials or as heat-resistant coatings and linings for a variety of purposes.

According to J. Polymer Sci. A–1, 5, 2,359 et seq. (1967), polybenzoxazinones with recurring units of the formula

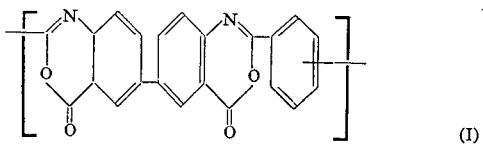

are obtained by reacting benzidine-3,3'-dicarboxylic acid with isophthaloyl or terephthaloyl chloride in organic solvents, such as N-methyl-2-pyrrolidone, in the presence of lithium chloride, to form polyamido carboxylic acids and then heating the films obtained from these polyamido carboxylic acids, water being eliminated during heating. Unfortunately, the polyamido carboxylic acid is substantially insoluble and can only be kept in solution by the aforementioned addition of inorganic salts. Our investigations have shown, moreover, that even under these conditions, the polymer is precipitated after only a short time.

According to the Netherlands Pat. specification No. 69 08 835, polyamido carboxylic acids of improved solubility, which can be converted into filaments, fibers or films, can be obtained by employing bis-anthranilic acids containing several aromatic rings attached to one another through hetero atoms. The aforementioned Netherlands Patent specification relates, for example, to polybenzoxyzinones with recurring units of the formula III formed by the dehydration at elevated temperatures of polyamido acids of formula II

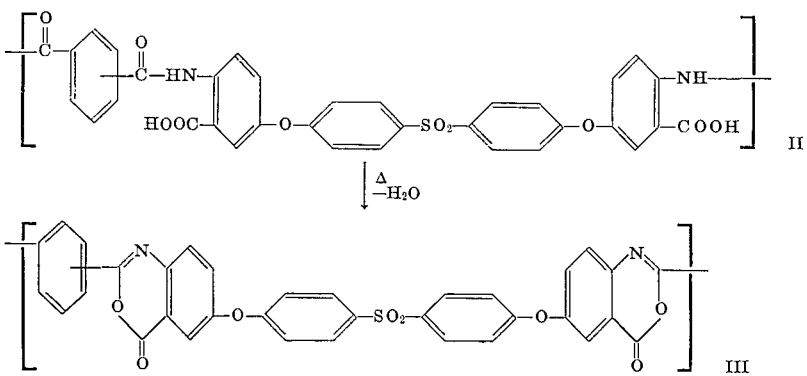

It has been found, however, that the removal of water from the polyamido acids under heat is an operation which is extremely difficult to control. It only proceeds smoothly in thin layers and at an adequate velocity at temperatures above 250° C.

In some instances, for example in the production of fine filaments, these conditions are easily attained on a commercial scale. Spectroscopic investigations, however, have shown that the maximum degree of cyclisation attainable is 90 percent. In addition, the pronounced change to a brown color occurring during the prolonged heating period shows that the material undergoes decomposition to some extent. Bubble formation is occasionally observed, too, especially with relatively thick layers.

A polybenzoxyzinone, ring-closed by heat treatment, usually exists in a dense, compact form and does not allow any further physico-chemical or chemical processes. In most instances, the heat-treated polybenzoxazinone is insoluble in organic solvents.

It is known from J. Macromol. Sci.-Chem. A 1(6) 1,069 et seq. (1967) that polybenzoxyzinones of formula I can be obtained by condensing benzidine-3,3'-dicarboxylic acid with isophthalic or terephthalic acid and their derivatives in polyphosphoric acid. Although polybenzoxyzinones can be obtained in a single step by this process, it is only possible to prepare solutions of low concentration. Since polyphosphoric acid itself is a highly viscous liquid, its viscosity is increased by the dissolved or formed highly polar polybenzoxazinone to such an extent that uniform admixture is difficult. Problems are also encountered when the polymer is precipitated in water.

For these reasons, and also for economic reasons, the use of polyphosphoric acid in the production of polybenzoxyzinones has never been adopted on a large scale.

It is an object of this invention to provide a process that avoids the disadvantages mentioned above.

This object is accomplished by an improvement in the process for the production of high molecular weight polybenzoxazinones by reacting bis-anthanthranilic acid derivatives with aromatic dicarboxylic acid dihalides followed by ring closure of the resulting polyamido caboxylic acid obtained, which comprises treating a polyamido carboxylic acid derivative selected from the group consisting of a polyamido carboxylic acid and an ester thereof, said derivative containing recurring units of the general formula

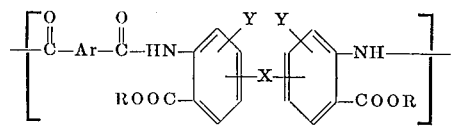

in which
R represents hydrogen or an alky, cycloalkyl or aryl radical,
X represents a single bond, —O—, —S—, —SO—, —SO$_2$—, —CH$_2$—, $-\overset{\text{alkyl}}{\underset{\text{alkyl}}{\text{C}}}-$, —CO—, the group —O—Ar'—O— or a bifunctional heterocyclic radical,
Y represents hydrogen, alkyl or alkoxy having one to four carbon atoms, or halogen, and Ar and Ar' represent mononuclear or polynuclear aromatic radicals substituted or not, which may be attached by X, with a liquid or dissolved dehydrating agent, said treating being carried out in an organic solvent. Optionally, the treatment is carried out at elevated temperature.

The process according to the invention may be used with particular advantage when the polyamido carboxylic acids or esters are prepared in situ in the organic solvent used. Although dehydration need not necessarily be carried out in homogeneous solution, this modification is preferred. In fact it is sufficient for the polyamido carboxylic acid to be present in swollen form. In this instance, it is merely necessary to ensure that the reaction medium is thoroughly mixed.

It is possible in this way to obtain high molecular weight polybenzoxyzinones with recurring units of the general formula

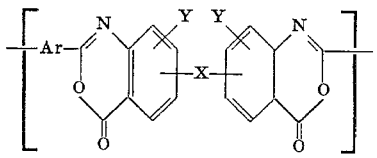

in which X, Y and Ar have the meanings given above.

The polyamido carboxylic acids or esters corresponding to the general formula

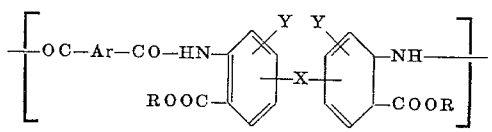

in which R, X, Y and Ar have the meanings given above, may be prepared from any bis-anthranilic acids, or their esters, individually or in admixture with one another. The following are examples fo such compounds of the general formula

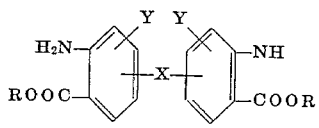

4,4'-diaminodiphenyl-3,3'-dicarboxylic acid; 4,4'-diaminodiphenyl-methane-3,3'-dicarboxylic acid; 4,4'-diaminodiphenyl-ether-3,3'-dicarboxylic acid; 3,3'-diaminodiphenyl sulphone-4,4'-dicarboxylic acid; 4,4'-bis-(3-carboxy-4-aminophenoxy) -di-phenyl sulphone; and 4,4'-bis-(4-carboxy-3-aminophenoxy)-diphenyl sulphone. The last two compounds can be obtained from the dipotassium salts of 5-hydroxy anthranilic acid and 4-hydroxy anthranilic acid , or their azo compounds, by reaction with 4,4'-dichlorodiphenyl sulphone in dimethyl sulphoxide. When the azo compounds are used, the free amino carboxylic acids are obtained by subsequent hydrogenation.

These bis-anthranilic acids or their esters are reacted in known manner with any aromatic dicarboxylic acid dihalides of the general formula

HalOC — Ar — COHal, wherein Ar has the meaning as given above and Hal is chlorine or bromine, in polar organic solvents, optionally in the presence of tertiary bases and solution-promoting salts, and the polyamido carboxylic acids formed are isolated, or are preferably further reacted directly, i.e. without isolation, by the process according to the invention.

Suitable dicarboxylic acid dihalides include: isophthaloyl chloride; terephthaloyl chloride; diphenyl ether-4,4'-dicarboxylic acid dichloride; 2,6-naphthalene dicarboxylic acid dichloride; 4,4'-diphenyl carboxylic acid dichloride;4,4'-bis-(4-chlorocarbonyl-phenoxy)-diphenyl sulphone; and diphenyl sulphone-4,4'-dicarboxylic acid dichloride.

The last dicarboyylic acid dichloride is obtained in accordance with conventional methods by the action of thionyl chloride on 4,4'-bis-(4-carboxyphenoxy)-diphenyl sulphone. This dicarboxylic acid is obtained by reacting 4,4'-dichlorodiphenyl sulphone with at least 2 moles of the dipotassium salt of 4-hydroxybenzoic acid in dimethyl sulphoxide at a temperature of from 100° to 140° C.

Highly polar aprotic compounds, e.g. N-substituted amides such as N,N-dimethyl acetamide, N,N'-diethyl acetamide, N-methyl caprolactam and, preferably, N-methyl-2-pyrrolidone, may be used as solvents in the preparation of the polyamido carboxylic acid or esters thereof.

The process according to the invention for producing the high molecular weight polybenzoxyzinones is carried out by allowing liquid or dissolved solid dehydrating agents to act under heat on the thus prepared polyamido a carboxylic acids, or their esters, in polar organic solvents. It is preferred, directly to use the polymer solutions obtained by the polycondensation reaction, and to heat them at temperatures of from 50° to 200° C., and preferably from 80° to 150° C., following addition of the dehydrating agent, and optionally following dilution with more solvent.

The following compounds may be used as dehydrating agents: phosgene; chloroformic acid esters; carboxylic acid chlorides; carboxylic acid anhydrides; phosphorus trichloride, phosphorus oxychloride; phosphorus pentachloride and the corresponding bromides; thionyl chloride; concentrated sulphuric acid; complexes of sulphur trioxide with dimethyl formamide; pyridine or other tertiary bases; chlorosulphonic acid; chlorosilanes; zinc chloride; or phosphorus pentoxide. Phosphorus pentoxide, phosphorus oxychloride and thionyl chloride are preferably used.

These compounds are used in such quantities so that the quantity of water to be eliminated can be obsorbed, although in some instances there is no harm in using a slight excess, except that precautions must then be taken to ensure that some of the aforementioned agents can react with the solvent. The adducts and compounds formed in this instance, however, are generally removed during subsequent precipitation of the polymer and washing with water.

The polybenzoxazinones formed are generally less soluble in the reaction mixture than the open polyamido carboxylic acids or their esters, and in some instances can precipitate from the solution. This is due in part to the generally strongly acid reaction products of the dehydrating agent which are formed, although it does not present any disadvantes so far as the process is concerned. In many instances, this phenomenon can be used to remove low molecular weight impurities, discolorations and residues and reaction products of the dehydrating agent by filtering off or decanting the mother liquor, or a polymer-poor phase of the solution, from the polymers precipitated, thus separating off most of the secondary products.

The polymer is subsequently or, when homogeneous solutions are present, directly precipitated by stirring into water, lower alcohols or other non-solvent liquids, carefully washed and dried. It is then in loose or fibrous form and can be dissolved, optionally in other solvents, either for the production of shaped articles such as fibers, films, or coatings, or for the production of polyquinazolones by reaction with amines.

The infra-red spectrum of the open polyamido carboxylic acids show a strong, relatively wide absorption band at around 1,670 cm$^{-1}$. During conversion into the benzoxazinone structure, this band disappears more or less completely depending on the degree of cyclisation, and the extent of the ring-closure reaction can be calculated therefrom. In its place, a particularly characteristic absorption band appears at around 1,760 cm$^{-1}$, due to the CO group of the benzoxazinone. The extent to which open amido carboxylic acid units are converted into benzoxyzinone units, i.e. the degree of cyclisation, is in excess of 80 percent and in most instances in excess of 90 percent. The polymer does not undergo any degradation in the process according to the invention. In fact, it has surprisingly been found that in all the instances investigated, there was a further increase in molecular weight as shown by viscosity measurements. Even when the polymer was precipitated from the reaction mixture, its relative solution viscosity was equal to or higher than that of the initial polyamido acid. This discovery can be regarded as a further advantage over high-temperature dehydration.

The following examples are to further illustrate the invention without limiting it. The ratio of parts by weight to parts by volume is as the ratio of kg to liters.

EXAMPLE 1 a. Preparation of the polyamido carboxylic acid 27.23 parts by weight of 4,4'-diaminobiphenyl-3,3'-dicarboxylic acid are dissolved under nitrogen in 400 parts by volume of anhydrous N-methyl-2-pyrrolidone, followed by the addition with stirring of 20 parts by weight of dry lithium chloride and then by the addition, while cooling with ice, of 20.3 parts by weight of isophthaloyl chloride. The polyamido carboxylic acid gradually begins to precipitate from the thickening solution, accompanied by clouding. The mixture is stirred for another 4 hours at room temperature. A sample of 45 parts by volume is precipitated with water, washed and dried. The polyamido carboxylic acid formed consists of recurring units of the formula

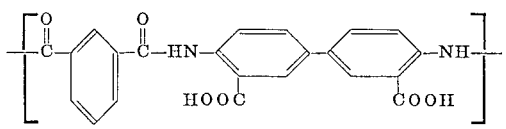

A 1 percent by weight solution in concentrated sulphuric acid has a relative viscosity at 20° C. of $\eta_{rel.} = 1.68$.

b. Preparation of the polybenzoxyzinone 13 parts by weight of phosphorus pentoxide are added to the mixture prepared in accordance with (a), and the resulting product is stirred under nitrogen for 6 hours at 140° C. A greyish-green paste is formed, which is subsequently introduced into vigorously stirred water, and the now completely precipitated polymer is suction filtered and thoroughly washed, resuspended in methanol and then dried after re-filtration under suction and washing with methanol. Yield 35 parts by weight, or 95 percent of the theoretical. More than 90 percent of the polybenzoxazinone formed consists of recurring units of the formula

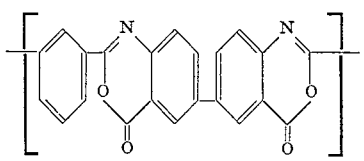

as can be established from disappearance of the amide absorption band on comparison of the infra-red spectra.

A 1 percent by weight solution of concentrated sulphuric acid has a relative viscosity at 20° C. of $\eta_{rel.} = 1.73$.

EXAMPLE 2 a. Preparation of the polyamido carboxylic acid 12.18 parts by weight of isophthaloyl chloride are added while cooling at +5° C. to 31.20 parts by weight of 4,4'-bis-(3-carboxy-4-aminophenoxy)-diphenyl sulphone in 120 parts by volume of absolute N-methyl-2-pyrrolidone. The viscous solution is stirred for 4 hours at room temperature, after which 25 parts by volume are removed, and precipitated by addition to water, and the size-reduced polymer is washed thoroughly with water and methanol and dried. The polyamide obtained has recurring units of the formula

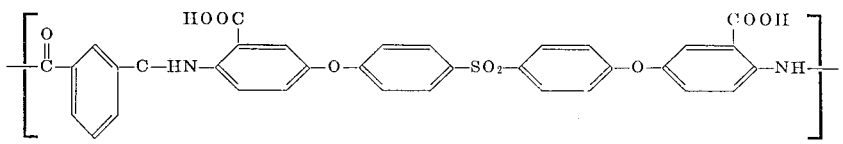

A 0.5 percent by weight solution in N-methyl pyrrolidone has a relatively viscosity at 20° C. of $\eta_{rel.} = 1.55$.

b. Preparation of the polybenzoxazinone

The rest of the polyamide solution left in the flask is diluted with 100 parts by volume of anhydrous N-methyl pyrrolidone, followed after thorough mixing by the dropwise addition with stirring of a mixture, prepared while cooling, of 20 parts by volume of N-methyl pyrrolidone and 10 parts by volume of phosphorus oxychloride. The mixture is then heated for 2 hours at 100° C., after which the supernatant dark solution is decanted off from the polymer precipitated, and the polymer is dissolved in fresh N-methyl pyrrolidone at 140° C. and then precipitated into water. More than 80 percent of the size-reduced polymer, washed neutral and dried, consists of polybenzoxazinone units of the formula

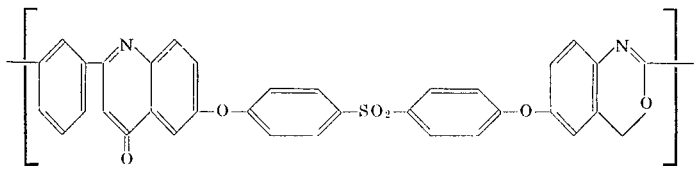

as can be established from disappearance of the amide absorption band on comparison of the infra-red spectra.

A 0.5 percent by weight solution in N-methyl pyrrolidone has a relative viscosity of 20° C. of $\eta_{rel.} = 1.58$.

EXAMPLE 3

A polyamido carboxylic acid is prepared as in Example 2a from 52.05 parts by weight of 4,4' -bis-(3-carboxy-4-aminophenoxy)-diphenyl sulphone and 20.3 parts by weight of isophthaloyl chloride in 200 parts by volume of anhydrous N-methyl pyrrolidone. The viscous solution is diluted with 200 parts by volume of absolute N-methyl pyrrolidone and, following the addition of 30 parts by weight of phosphorus pentoxide, is stirred for 4 hours at 130° C. The mixture separates into a dark-colored, mobile lightweight phase of low polymer content, and a light-colored highly viscous heavy phase of high polymer content. The mobile dark-colored solution is separated off and the residual polymer is dissolved in fresh N-methyl pyrrolidone under heat. It is then precipitated into vigorously stirred water, washed until neutral and dried. Light colored coarse-fibred polybenzoxazinone with recurring units of the kind shown in Example 2b is obtained in a yield of 58 parts by weight. The degree of ring closure is in excess of 90 percent. A 0.5 percent by weight solution in N-methyl pyrrolidone has a relative viscosity at 25° C. of $\eta_{rel.} = 0.65$.

The polymer is soluble in N-methyl pyrrolidone above 60° C., even in relatively high concentrations, and can be converted from the solution into films or filaments. A film thus prepared is initially dried for 24 hours at 150° C. and then heat-treated in air at 260° C. Even after 1,000 hours, it is still not brittle.

EXAMPLE 4 a. Preparation of the polyamidocarboxylic acid 26.37 parts by weight of 4,4'-diphenoxydiphenyl sulphone-4'',4'''-dicarboxylic acid chloride are added with thorough cooling to 26.03 parts by weight of 4,4'-bis-(3-carboxy-4-aminophenoxy)-diphenyl sulphone in 150 ml of anhydrous N-methyl-2-pyrrolidone. The viscous solution is stirred for 5 hours at room temperature, after which approximately one-quarter is precipitated into water, washed, and isolated and the polymer is dried. It consists of recurring units of the formula

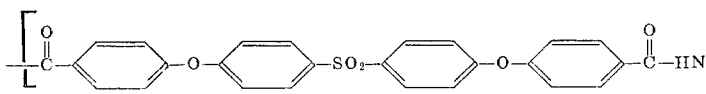

A 0.5 percent by weight solution in N-methyl pyrrolidone has a relative viscosity of $\eta_{rel.} = 1.50$ b. Preparation of the polybenzoxazinone 50 parts by volume of N-methyl pyrrolidone are added to the remaining three quarters of the polyamide solution prepared in accordance with (a), followed by stirring until the solution is homogeneous again. 7.0 parts by volume of pure phosphorus oxychloride are then added dropwise at room temperature followed by stirring for 5 hours at 60° C. The polymer is then precipitated into water, washed until neutral, suspended with methanol, isolated and dried. More than 90 percent consists of polybenzoxazinone units of the formula

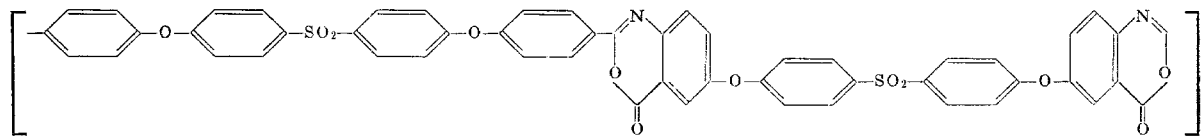

as can be demonstrated by comparing the infra-red spectra.

A 0.5 percent by weight solution in N-methyl pyrrolidone has a relative viscosity at 25° C. of $\eta_{rel.} = 1.49$.

A 25 percent by weight solution of the polybenzoxazinone in dimethyl acetamide is cast into a film 30 μ thick which, after drying for 24 hours at 130° C., is heat-treated in air at 250° C. Under these conditions, the film is still not brittle even after 1,000 hours.

EXAMPLE 5

The procedure is as described in Example 4 except that 5.0 parts by volume of thionyl chloride are used instead of the phosphorous oxychloride employed in that example, and the mixture is stirred for 3 hours at 60° C. The product is then worked up as described above. More than 90 percent of the polymer has been converted into polybenzoxazinone, as shown by the infra-red spectrum.

A 0.5 percent by weight solution in N-methyl pyrrolidone has a relative viscosity at 25° C. of $\eta_{rel.} = 1.48$. Example 6

The procedure is as in Example 4, except that dimethyl acetamide rather than N-methyl pyrrolidone is employed as solvent, and 27 parts by volume of a 3-molar solution of a sulphur trioxide in dimethyl formamide are added to the remaining solution, following removal of the sample indicated. The mixture is then stirred for 5 hours at 100° C., and worked up as described above. The degree of ring closure is around 80 percent as shown by the infra-red spectrum.

A 0.5 percent by weight solution of the polybenzoxazinone in N-methyl pyrrolidone has a relative viscosity at 25° C. of $\eta_{rel.} = 1.52$.

What we claim is:

1. In the process for the production of high molecular weight polybenzoxazinones by reacting bis-anthranilic acid derivatives with aromatic dicarboxylic acid dihalides, followed by ring closure of the resulting polyamido carboxylic acids obtained, the improvement which comprises treating a polyamido carboxylic acid derivative selected from the group consisting of a polyamido carboxylic acid, and an ester thereof, said derivative consisting essentially of recurring units

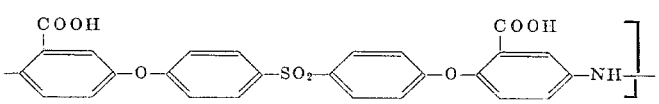

of the general formula

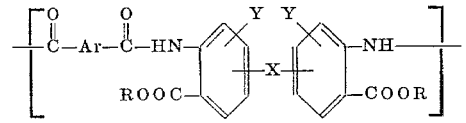

in which

R represents hydrogen or an alkyl, cycloalkyl or aryl radical;

X represents a single bond —O—, —S—, —SO—, —SO₂—, —CH₂—, $$-\underset{\text{alkyl}}{\overset{\text{alkyl}}{\text{C}}}-, \quad -CO-, \text{ or the group } -O-Ar'-O-$$

Y represents hydrogen, alkyl or alkoxy having one to four carbon atoms, or halogen; and Ar and Ar' represent mononuclear or polynuclear aromatic radicals which are not substituted and which may be attached by X with a liquid or dissolved dehydrating agent, selected from the class consisting of phosphorous pentoxide, phosphorous oxychloride, and thionylchloride; said treating being carried out in an organic solvent wherein said organic solvent is an aprotic, polar solvent of the amide group.

2. The improvement of claim 1, wherein said treating is carried out at a temperature of from 50° to 200° C.

3. The improvement of claim 1, wherein said polar solvent of the amide type is N-methyl-2-pyrrolidone.

4. The improvement of claim 1, wherein said polar solvent of the amide type is N,N-dimethyl acetamide.

5. The improvement of claim 1, wherein said polyamido carboxylic acid derivative is prepared by reacting a bis-anthranilic acid derivative of the general formula

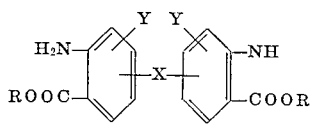

wherein R, X and Y have the meanings as given in claim 1, with aromatic dicarboxylic acid halide of the general formula HalOC — Ar — COHal wherein Ar has the meaning as given in claim 1 and Hal represents chlorine or bromine.

6. The improvement of claim 5, wherein said bis-anthranlic acid derivative is selected from the group consisting of 4,4'diaminodiphenyl-3,3'-dicarboxylic acid, 4,4'-diaminodiphenylmethane-3,3'-dicarboxylic acid, 4,4'-diaminodiphenylether-3,3'-dicarboxylic acid, 3,3'-diaminodiphenylsulfone-4,4'-dicarboxylic acid, 4,4'-bis(3-carboxy-4-aminophenoxy)-diphenylsulfone, and 4,4'-bis(4-carboxy-3-aminophenoxy)-diphenylsulfone.

7. The improvement of claim 5, wherein said aromatic dicarboxylic acid halide is selected from the group consisting of isophthaloylchloride, terephthaloylchloride, diphenylether-4,4'-dicarboxylic acid dichloride, 2,6-naphthalene-dicarboxylic acid dichloride, 4,4'-diphenyl-dicarboxylic acid dichloride, 4,4'-bis(4-chlorocarboxyphenoxy)-diphenylsulfone and diphenylsulfone-4,4'-dicarboxylic acid dichloride.

8. The improvement of claim 5, wherein said polyamido carboxylic acid derivative is reacted with said dehydrating agent in situ in the solvent in which is is prepared.

* * * * *

UNITED STATES PATENT OFFICE
CERTIFICATE OF CORRECTION

Patent No. 3,669,928                                Dated June 13, 1972

Inventor(s) Gunter Lorenz; Manfred Gallus; Wolfgang Giessler, and Gunther Nischk It is certified that error appears in the above-identified patent and that said Letters Patent are hereby corrected as shown below:

| COLUMN | LINE | ERROR |
|---|---|---|
| 3 | 40 in the formula | "-NH" should read --- $-NH_2$ --- |
| 6 | Ex. 2 second formula line 45 | 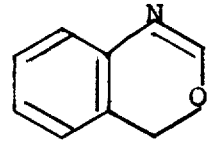 should read 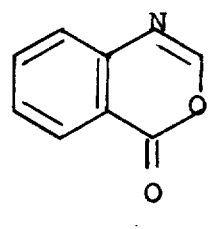 |
| 9 | Clm. 5 in the formula | "-NH" should read --- $-NH_2$ --- |

Signed and sealed this 26th day of November 1974.

(SEAL)
Attest:

McCOY M. GIBSON JR.           C. MARSHALL DANN
Attesting Officer              Commissioner of Patents